United States Patent [19]

Lambert

[11] 4,255,991
[45] Mar. 17, 1981

[54] METHOD AND APPARATUS FOR ELECTROMECHANICALLY RETRO-FITTING A CONVENTIONAL AUTOMATIC SCREW MACHINE TO ACCEPT NUMERICAL CONTROL

[76] Inventor: Robert D. Lambert, 20317-244th Ave. SE., Maple Valley, Wash. 98038

[21] Appl. No.: 36,043

[22] Filed: May 4, 1979

[51] Int. Cl.³ ............................................. B23B 3/00
[52] U.S. Cl. ..................................... 82/1 C; 82/2 B
[58] Field of Search ................ 82/2 R, 2 B, 2 C, 1 C

[56] References Cited

U.S. PATENT DOCUMENTS

| | | | |
|---|---|---|---|
| 2,423,440 | 7/1947 | Neergaard | 82/2 B |
| 2,475,245 | 7/1949 | Leaver et al. | 82/2 B |
| 2,814,007 | 11/1957 | Lesher et al. | 82/2 B |
| 2,832,023 | 4/1958 | Gough | 82/2 B |
| 3,324,364 | 6/1967 | Caruthers | 82/2 B |
| 3,854,353 | 12/1974 | Cutler | 82/2 B |
| 3,894,452 | 7/1975 | Kazik et al. | 82/2 B |
| 3,978,745 | 9/1976 | Okamoto | 82/2 B |
| 4,079,235 | 3/1978 | Froyd et al. | 82/1 C |

Primary Examiner—Harrison L. Hinson
Attorney, Agent, or Firm—Cole, Jensen & Puntigam

[57] ABSTRACT

A conventional single spindle automatic screw machine, which includes a number of conventional operating machine mechanisms to perform the machine functions, is retrofitted with air cylinder/air solenoid combinations actuatable by electrical signals to control the operational sequence of the machine mechanisms, replacing the existing mechanical system of trip drums and trip dogs which perform that function. Also, the driving means which control the movement of the turret and the cross slides, and hence, the machine tool, relative to the work piece, is disconnected from the machine motor and made independently controllable by the addition of servo or stepping motors which are actuatable by external electrical signals. The electrical signals for control of the added motors and the air cylinder/air solenoid combinations are provided by a numerical control apparatus.

13 Claims, 7 Drawing Figures

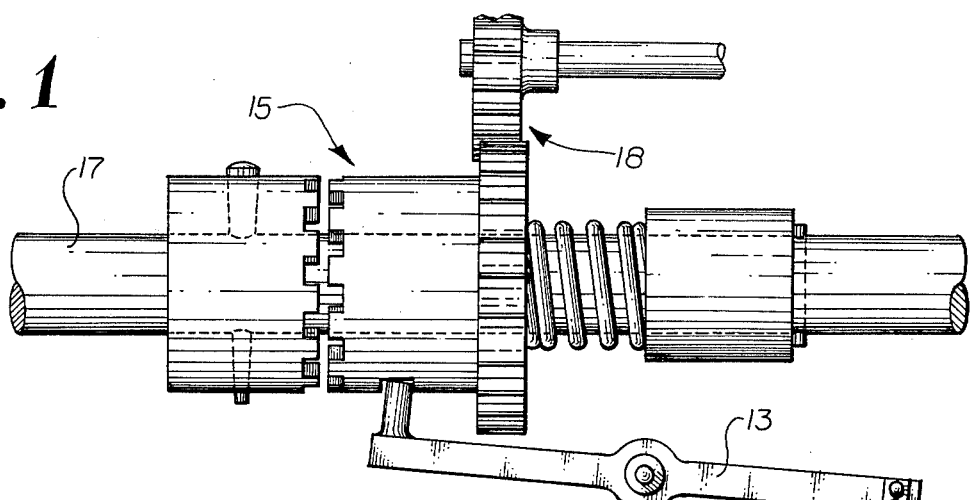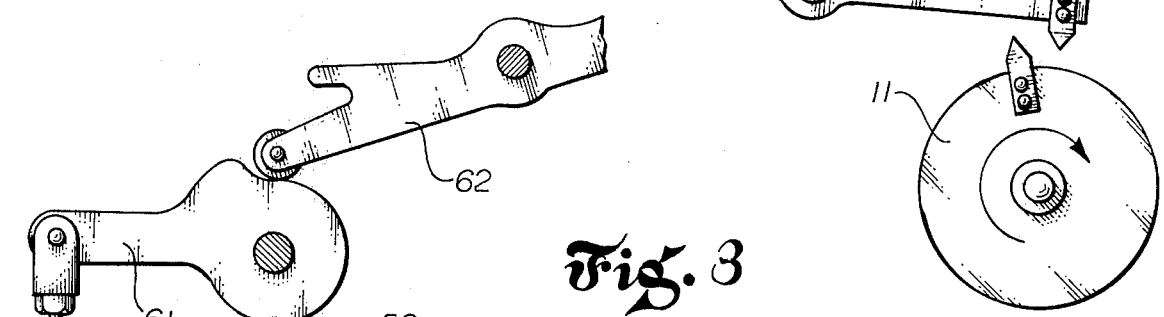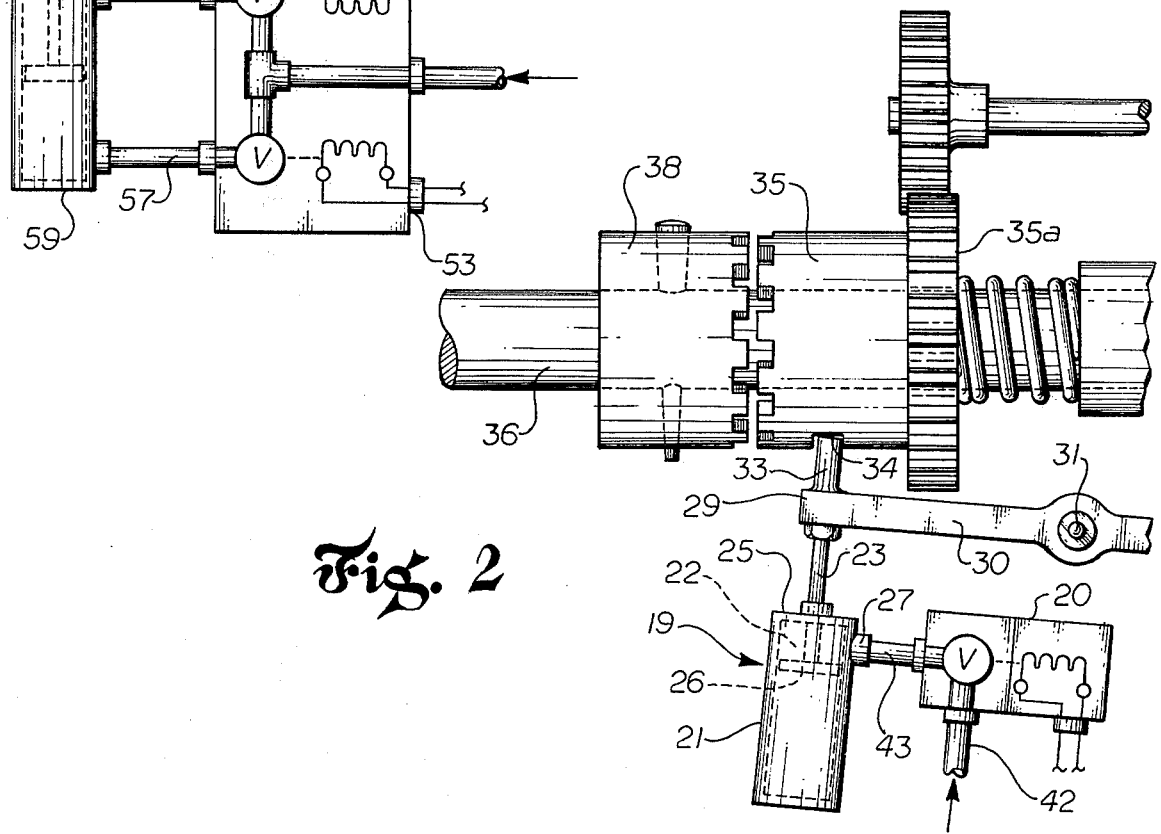

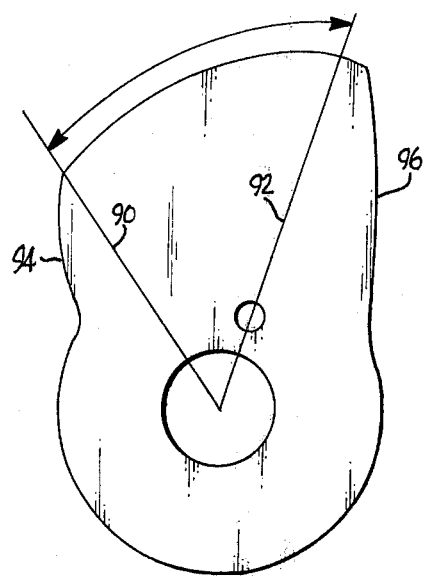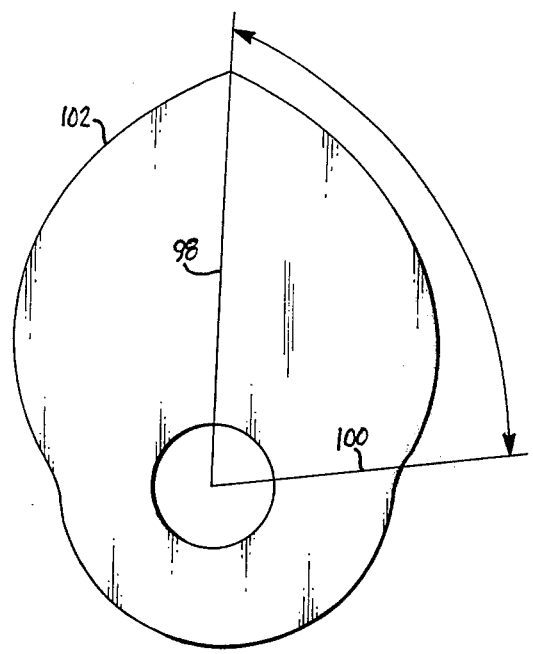
Fig. 6
Fig. 7

METHOD AND APPARATUS FOR ELECTROMECHANICALLY RETRO-FITTING A CONVENTIONAL AUTOMATIC SCREW MACHINE TO ACCEPT NUMERICAL CONTROL

BACKGROUND OF THE INVENTION

This invention relates generally to the art of automatic screw machines, and more specifically concerns a retrofit apparatus which converts existing conventional single spindle automatic screw machines to numerically controlled machines.

Conventional automatic screw machines have been known and used in the art for some time. The operational functions necessary to produce a given article are accomplished in an automatic, prescribed sequence by the machine. Such machines have a high capability for producing a large number of identical parts fairly rapidly. Automatic screw machines are particularly useful when large quantities of a single machined article are required. They lose their advantage, however, when smaller quantities are required, because of the time and expense necessary to produce the special control cams.

One of the operational functions of the automatically controlled machine is the movement of the machine tool relative to the work piece, which is generally accomplished by longitudinal movement of a turret and lateral movement of two or more cross slides. At least two cross slides are usually provided on a conventional screw machine. The two basic cross slides move laterally relative to the machine, and in the same horizontal plane as the movement of the turret. Additional cross slides may also be present, which slides are in the same vertical plane as the basic cross slides but are positioned at specified angles relative to the basic cross slides.

Other operational functions important to the performance of the machine include the indexing of the turret, the feedout of the stock, and the control of the spindle speeds. In addition, special purpose operational functions, like a deep hole drilling apparatus, may be provided on the machine.

In conventional automatic screw machines, the timed sequence of the above functions are controlled mechanically through cams, trip drums, trip levers and cam followers, which result in the engagement of the conventional machine mechanisms through clutches, gears, etc. at the proper time. Such an arrangement of mechanical devices is found in any conventional automatic screw machine.

The use of trip drum/cam/camshaft arrangement as a timing device has significant limitations, however, both in the time required to turn one article, and the time and expense required to produce the cams. A set of cams made for one job can be used on other jobs, although any change in machine speed or feedrate in any part of the sequence will result in slowing down the entire job. The alternative is to make a complete new set of cams specifically designed for the job.

Valuable time is also lost in the manufacturing sequence itself with the cams, as the tools shift position in the operation sequence. The tools chatter if the changes made in the sequence are too abrupt when a cam controls the timing. Thus, a certain amount of time in the manufacture of each article is lost because custom made cams are used as the timing control. In addition, each new article to be manufactured, or "job", usually requires several new cams. The manufacture of these cams require significant time and expense. If cams from another job can be used, they are usually not optimum, thus causing a further waste in time.

Hence, it is desirable that the operational sequence of the automatic screw machine be controlled by a numerical control apparatus. With numerical control apparatus, the machine functions can be controlled through electrical signals by a program, and the requirements of each job can be programmed into the apparatus easily and quickly. New automatic screw machines have been developed which have this numerical control capability. However, there is no known method or apparatus for retrofitting existing conventional automatic screw machines to permit numerical control of the timing functions.

Accordingly, it is a general object of the present invention to provide a method and apparatus for converting a conventional automatic screw machine to numerical control which overcomes one or more of the disadvantages of the prior art discussed above.

It is another object of the present invention to provide such a method and apparatus which electrically controls the timing of the various conventional automatic screw machine functions.

It is an additional object of the present invention to provide such a method and apparatus which is designed to adapt existing automatic screw machines to electrical timing control.

It is a further object of the present invention to provide such a method and apparatus which will decrease the time necessary for a conventional screw machine to produce a particular article.

It is yet another object of the present invention to provide such a method and apparatus which will simplify the process of setting the screw machine to produce a given article.

SUMMARY OF THE INVENTION

Accordingly, a method and apparatus for retrofitting a conventional automatic screw machine to accept numerical control is provided. A conventional automatic screw machine includes a plurality of mechanical timing means which operate through engaging means, such as clutches and gears, to connect a main driving means to various operating mechanisms of the machine. These mechanisms control the individual functions of the machine, e.g. the spindle speed, the indexing of the turret and the feeding of stock through the spindle. Also, the movement of the turret slide, towards and away from the work piece, and the movement of the cross slides, which contain the machine tools, are controlled through cam means, usually including a cam and a camshaft, which are driven by driveshaft means which in turn is driven by the main driving means. In the method of the present invention, the mechanical timing means in the conventional screw machine are replaced with means for actuating the engaging means in response to an electrical signal; the turret slide and the cross slides are disconnected from the main driving means; and individually electrically actuatable drive means are connected so as to drive the cross slides independent of the main driving means and in reponse to an electrical signal. The apparatus of the present invention includes (1) means actuatable by an electrical signal for activating the engaging means for the various operating mechanisms at desired points in the operational sequence of the machine; and (2) means actuatable by an electrical signal for driving, independent of the main driving means, the mechanical means which controls movement of the turret slide and the cross slides.

DESCRIPTION OF THE DRAWINGS

A more thorough understanding of the invention may be obtained by a study of the following detailed description taken in connection with the accompanying drawings in which:

FIG. 1 is a simplified diagram showing a prior art apparatus for timing control of the operational functions of a conventional screw machine.

FIG. 2 is a simplified diagram showing the apparatus of the present invention for timing control of the operational functions of a conventional screw machine.

FIG. 3 is a simplified diagram showing apparatus for timing control of the deep hole drilling function of a conventional screw machine.

FIG. 6 is a diagram showing the outline of a universal cross-slide cam, useful in the present invention.

FIG. 7 is a diagram showing the outline of a universal turret cam useful in the present invention.

DESCRIPTION OF PREFERRED EMBODIMENT

Figure 4:
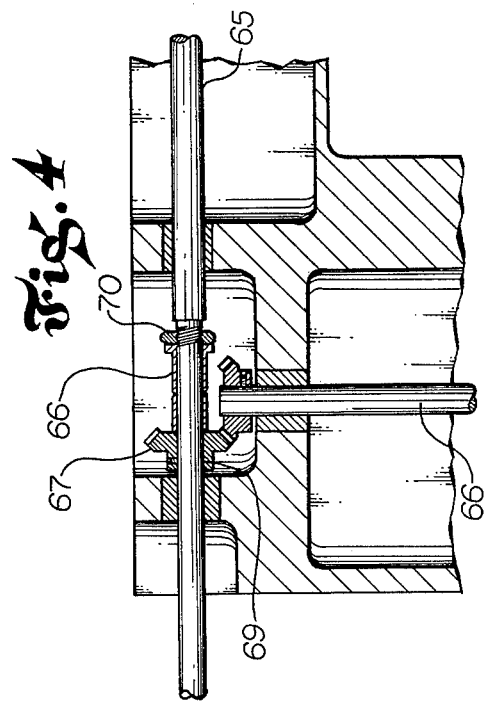
FIG. 4 is a diagram showing the coupling between the two tool moving driveshafts of the invention shown in FIG. 2.

At least three of the primary operational functions of an automatic screw machine are accomplished by mechanisms which are engaged through clutches and gears from a driveshaft which is powered by one or more motors in the base of the machine. These mechanisms are conventional and can be found in any automatic screw machine. The three mechanisms include one for indexing, i.e. revolving the turret, one for feeding the stock into position in the spindle for manufacturing, and one for controlling the spindle speed.

Referring to FIG. 1, they are typically activated at desired times in a given manufacturing sequence by mechanical trip drums 11, which at the proper point in time cooperate with a lever 13 which in turn releases a clutch or similar device shown generally at 15, positioned on a driveshaft 17 to activate the mechanisms through a gearing arrangement shown partially at 18.

Referring now to FIG. 2, the present invention replaces the mechanically driven trip drum apparatus with an arrangement which includes an air cylinder 19 and an air solenoid 20. The air cylinder 19 is a conventional apparatus available as an off-the-shelf item from various manufactures. Typically, it comprises an airtight metal cylinder 21, in which is positioned a piston 22, with a piston rod portion 23 extending upwards through the upper end 25 of the air cylinder. A piston head portion 26 engages the interior sides of the metal cylinder 15 in an air sealing relationship. An opening 27 is provided near the upper end 25 of the cylinder 21, permitting entry of air into the cylinder.

The free end of the piston rod portion 23 engages one end 29 of the conventional trip lever 30, which rotates about pivot point 31. When the particular operational mechanism controlled by trip lever 30 is disengaged, an extension 33 which extends upwardly from the trip lever 30 in the vicinity of the one end 29 thereof engages a mating opening 34 in the free half 35 of the conventional dog clutch on a machine driveshaft 36. The driveshaft 36 rotates freely through the free half 35 of dog-clutch. The free half 35 is urged toward engagement with a fixed half 38 of the dog clutch, which is pinned to driveshaft 36 and rotates therewith, but is prevented from such engagement when extension 29 mates with the mating opening 34.

When one of the mechanisms, such as the turret indexing mechanism, is to be engaged, the one end 29 of trip lever 30 is rotated downwardly under the influence of the free end of the piston rod, releasing the free half 35 of the dog clutch to engage the fixed half 38.

In operation of air cylinder 19 and air solenoid 20, air is forced through opening 23 into the upper interior of the air cylinder, forcing the piston 17 downwardly, thereby urging the one end 29 of the trip lever downwardly about pivot point 27. Engagement between halves 35 and 38 of the dog clutch results in rotation of free half 35, including geared portion 35a. Geared portion 35 mates with the conventional machine gears (partially shown) which in turn drive the individual operational mechanisms.

The air for air cylinder 19 is supplied by an air solenoid 20 which is a conventional device available from various manufacturers. The air solenoid 20 is activated by electrical signals, supplied through leads, from a computer device. In operation, air is drawn into the body of air solenoid 20 through an entry pipe 42 when the solenoid is activated and then pushed out through pneumatic tube 43 which joins opening 27 in the air cylinder 19.

Through the combination of the air solenoid 20, which is activated by electrical signals, and the air cylinder 19, the operational mechanisms of the screw machine can be activated and deactivated. The mechanical timing devices, and their associated disadvantages of lost manufacturing time and expense, are thus eliminated, without disturbing the basic operating mechanisms of the machine or their individual activation means.

In a conventional automatic screw machine, the indexing of the turret, the feedout of the stock, and the spindle speed are all controlled, i.e. their operation initiated, through devices like that shown in FIG. 2.

The spindle speed is partially controllable by existing electrical clutches in the base of the machine, usually adjacent the motor. A variety of spindle speeds may be obtained with the combination of the electrical speed clutches and the mechanical clutches operating off of the driveshaft. With the method and apparatus of the present invention, the electrical signals to activate the electrical clutches, accomplished by a coil, are supplied from the computer.

FIG. 3 shows a slightly modified arrangement of the air cylinder and air solenoid combination of FIG. 2. The solenoid 50 of FIG. 3 is a four way solenoid having two electrical connections 51 and 53. These electrical connections activate the solenoid 50 to provide air through pneumatic lines 55 and 57 to the top and bottom of the air cylinder 59, respectively. This permits positive control of the piston (not shown) in the air cylinder 59 in both directions, depending upon which portion of the solenoid 50 is activated. The piston rod from the air cylinder 59 activates a specially configured brass cam 61 which in turn engages what is known in the art as a deep hole drill engagement arm 62, which is a conventional lever-like device found on conventional automatic screw machines. Contact by the cam 61 with the engagement arm will result in the machine tool held in the arm drilling a deep hole in the article being worked.

Providing an electrical signal to one contact of the air solenoid 51 will result in activation of the deep hole drilling mechanism, while an electrical signal provided to the other electrical contact will result in a deactivation of the deep hole drilling mechanism.

With the apparatus shown in FIGS. 2 and 3, independent electrical control, such as by a numerical control apparatus, is achieved over those basic operating mechanisms of the machine which operate by trip dogs, clutches and gears off the main driveshaft.

The remaining operational functions of the machine concern the movement of the turret relative to the work piece held in the spindle, and the movement of the cross slides relative to the work piece. The turret, which may hold a plurality of tools around it periphery, moves in a longitudinal direction relative to the work piece, i.e. in the X axis direction (horizontal plane) when the machine is viewed in elevation, while the cross slides, which also hold machine tools, move laterally relative to the work piece, i.e. in a Y axis direction (vertical plane).

Conventionally, there are at least two cross slides, positioned on either side of the spindle, in approximately the same horizontal plane as the turret. The tools on the cross slides thus move in and out laterally relative to the work piece. Additional cross slides may be provided, however, in the same vertical plane as the horizontal cross slides but remote therefrom by some specified angle. In one particular embodiment for instance, two additional cross slides are provided at approximately 60° angles relative to the horizontal cross slides. In this configuration, the additional cross slides are situated above the horizontal cross slides.

In conventional automatic screw machines, the movement of the turret and the cross slides relative to the work piece is controlled by a cam and cam follower arrangement. The cams are located on cam shafts, one cam shaft for the turret and another cam shaft for the cross slides. One cam is provided for the turret and one cam is provided for each cross slide. These two cam shafts then mate with two associated auxiliary driving shafts through conventional worm and ring gear arrangements. Typically, the two auxiliary driving shafts are coupled together, so that when one auxiliary shaft is driven from the main driving shaft, both auxiliary shafts move, rotating in turn the two cam shafts on which are mounted the timing cams.

FIG. 4 illustrates a possible coupling arrangement of two auxiliary driveshafts 65 and 66. Other arrangements are of course possible. In FIG. 4, they are coupled together by a conventional serrated gear and sleeve arrangement which is represented generally by the numeral 68 in FIG. 4. To one side of the serrated gear and sleeve arrangement is a bevel gear 67 held by a nut 69, while on the other side is a second nut 70. Although the coupling described above is conventional, other kinds of coupling mechanisms may be used in particular automatic screw machines. In still other machines, the two auxiliary driveshafts may be driven independently from the main shaft.

Figure 5:
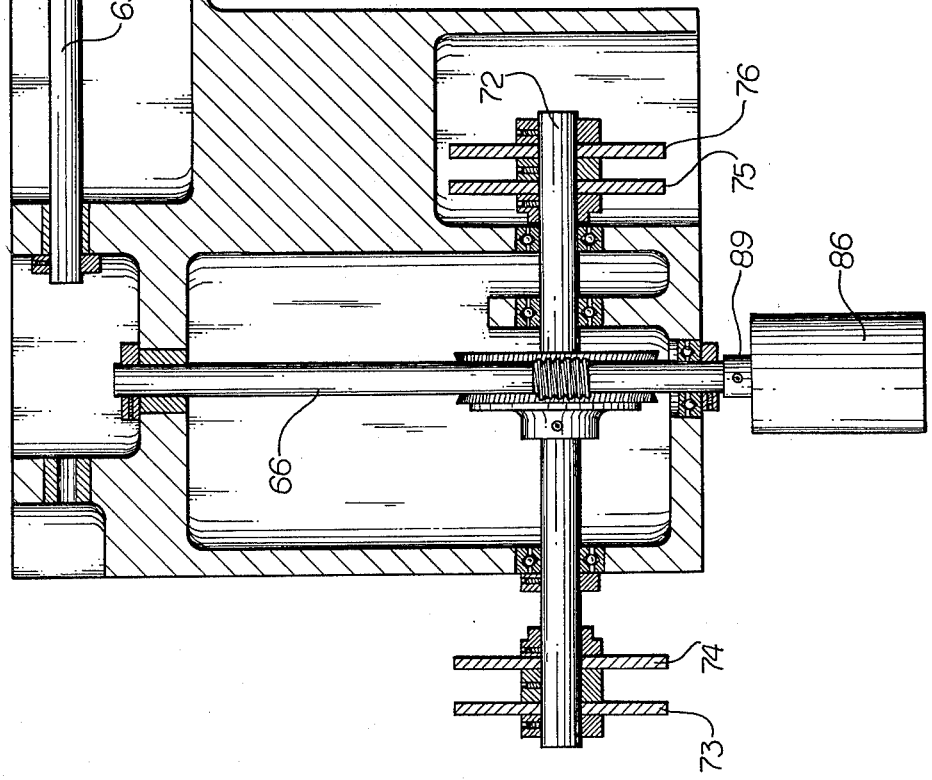
FIG. 5 is a diagram showing the apparatus for timing control of the operation of certain other functions of the screw machine by electrical signals.

In retrofitting this aspect of an automatic screw machine, the auxiliary driveshafts, e.g. shafts 65 and 66, are first decoupled from each other (if they need to be decoupled) and then disengaged from the main driving shaft. To uncouple the shafts in the configuration of FIG. 4, nuts 69 and 70 are loosened, and bevel gear 67 moved away from the coupling. The decoupling of these two shafts does not harm their operational capability, as each shaft is still supported by appropriate bearings and bushings. The worm and ring gear coupling between driveshaft 65 and its associated camshaft 71, and between driveshaft 66 and its associated camshaft 72 (FIG. 5) are not disturbed, however, After the two auxiliary driveshafts 65 and 66 have been disconnected, an electrically actuated motor is connected to each shaft, as shown in FIG. 5. A DC servo motor or an AC stepping motor 83 is connected at the end of auxiliary drive shaft 65 through a conventional coupling 85. Likewise, a similar motor 86 is connected to auxiliary driveshaft 66 through a coupling 89. Motors 83 and 86 control the rotation of camshafts 71 and 72, in forward or reverse direction, through driveshafts 65 and 66 and hence the position of the cams, which determines the timing sequence of machine activation.

In the embodiment shown in FIG. 5, four cams 73-76 control the four cross slides. If there are a different number of cross slides, a different number of cams will be used. Turret cam 81, positioned on camshaft 72, controls the timing of the movement of the turret.

The cross slide cams 73-76 and the turret cam 81 are, in the embodiment shown, universal cams, i.e. cams which can be used from job to job to move the cross slides. A universal cross slide cam is shown in FIG. 6, while a universal turret slide cam is shown in FIG. 7. These cams are designed specifically to provide a one to one correlation between an amount of desired cross-slide/turret travel selected by the operator and programmed into the numerical control apparatus and the actual amount of cross-slide/turret travel at the machine.

Referring to FIG. 6, the working area of the universal cross-slide cam, i.e., the portion of the cam which controls the movement of the cross slides is between lines 90 and 92. The working area of this cam has a 6.000 inch lead (i.e. 0.060 inches per hundredth of cam spacing, or 3.6°). The small curved portion 94 of the cam immediately preceeding line 90 is the approach portion of the cam, while the almost vertical portion 96 following line 92 is the drop-off portion of the cam. Referring to FIG. 7, the working area of the turret cam is between lines 98 and 100. This working area has a 8.000 inch lead. The portion 102 of the cam preceeding line 98 is the drop off portion of the cam. Other configurations of universal cams can be used, but the cams shown in FIGS. 6 and 7, and described briefly above, have been found by the inventor to provide the desired operation.

As an alternative to the universal cams, operating through the individual driveshafts and camshafts shown in FIGS. 4 and 5, the auxiliary driveshafts and the camshafts may be completely disconnected from the cross-slides, and ball screws may be used to drive the cross slides and the turret slide. Each of the ball screws, which are conventional, would be controlled individually by a separate motor, thus providing completely independent control over the operation of each cross slide and turret slide. The ball screw embodiment, however, would be somewhat more expensive and more complicated to implement than the universal cam embodiment.

With the cam embodiment of FIG. 5, or the ball screw embodiment, independent electrical control, such as with numerical control signals, is achieved over the movement of the turret, i.e. the X axis cutting plane, and the movement of the cross slides, i.e. the Y axis cutting plane.

The electrical signals for the actuation of the devices shown in FIGS. 2, 3 and 5 are provided by a programmable numerical control computer which has been programmed to provide the necessary electrical signals at the correct times to result in a correct sequence of mechanical operations in the manufacture of the article. In the embodiment shown, an apparatus marketed under the trademark "Bandit" by the Summit Engineering Corporation is used to provide the necessary electrical signals. This apparatus is currently used for numerical control of milling machines. The apparatus is designed to be programmable by the operator via input controls on the face of the apparatus to provide the necessary electrical signals to the screw machine in proper sequence. Although a particular programmable numerical control apparatus has been noted above, it should be understood that a number of other similar available devices could be used. In addition, the numerical control computer is not considered to be part of the present invention.

In certain conventional screw machines, certain operating conditions, such as loss of bar stock, will result in a shut down or operational modification of the machine. The mechanisms which accomplish those functions on a conventional machine are also routed to the numerical control apparatus to interrupt operation.

Hence, a method of retrofitting an existing automatic screw machine to accept numerical control has been described. By following the steps outlined above and implementing the apparatus described, a substantial amount of manufacturing time and cam processing time and expense can be saved.

Although a preferred embodiment of the present invention has been disclosed herein for purposes of illustration, it should be understood that various changes, modifications and substitutions may be incorporated in such embodiment without departing from the spirit of the invention, as defined by the claims which follow.

What is claimed is:

1. A method for retro-fitting a conventional automatic screw machine to accept numerical control, wherein said conventional machine includes a plurality of mechanical timing means which actuate engaging means, such as clutches and gears, which in turn are operative to connect a main driving means to a plurality of operating mechanisms of the machine, one of which controls the spindle speed, another of which controls the indexing of the turret and still another of which controls the feeding of the stock in the spindle, and wherein said conventional machine further includes a plurality of special purpose cam means which are also driven by the main driving means, for controlling the movement of the turret and the cross-slides of the machine, wherein each machining task performed by the conventional machine requires a new plurality of special purpose cam means designed particularly for the task, wherein the method comprises the steps of:
   (a) replacing the existing mechanical timing means for each operating mechanism in the conventional machine with means for actuating the engaging means associated therewith by an electrical signal, without modification of the existing engaging means;
   (b) disconnecting the turret and the cross slides from the main driving means and from the special purpose cam means, so that the turret and the cross slides are actuatable without said drive means and said cam means; and
   (c) connecting indivudally electrically actuatable drive means, respectively, to the turret and the cross slides, without modification of the turret and the cross sides, so that the turret and the cross slides are driven by said electrically controlled drive means instead of by said main driving means and said special purpose cam means, thereby eliminating the special purpose cam means otherwise necessary for the operation of the conventional machine.

2. A method of claim 1, wherein the conventional automatic screw machine includes a deep hole drilling mechanism and cam means for actuation thereof, and wherein the method includes the step of replacing the mechanical timing means for actuation of said deep hole drilling mechanism through said cam means with electrically actuatable actuating means.

3. A method of claim 1, wherein the screw machine includes electric switches for partial control of the spindle speed, and wherein the method includes the step of adapting said electric switches to receive electrical signals from a numerical control apparatus.

4. A method of claim 1, wherein the steps of replacing, disconnecting and connecting are reversible, so that the screw machine may be conveniently returned to conventional operation.

5. The method of claim 1, wherein said means for actuating the engaging means is pneumatically operated.

6. The method of claim 1, wherein the actuating means is connected directly to the existing engaging means.

7. The method of claim 1, wherein the conventional machine includes a first and second driveshaft means, which have, respectively, the special purpose cam means for the turret and the cross slides mounted thereon, said driveshaft means being driven by the main driving means, and wherein the step of disconnecting includes the step of disconnecting the first and second driveshaft means from the main driving means, and wherein the step of connecting includes the step of connecting said electrically actuatable drive means to the first and second driveshaft means.

8. In an automatic screw machine which includes engaging means, such as clutches and gears, which in turn operate to connect a main driving means to a plurality of operating mechanisms of the conventional machine, one of which controls the spindle speed, another of which controls the indexing of the turret, and still another of which controls the feeding of the stock in the spindle, and wherein the conventional screw machine further includes a plurality of special purpose cam means for controlling the movement of the turret and the cross slides, the improvement, which adapts a conventional automatic screw machine to numerical control, comprising:
   means actuatable by an electrical signal for in turn actuating the existing engaging means in the conventional machine at a desired point in the operational sequence of the machine; and
   means actuatable by an electrical signal for driving the existing turret and the cross slides in the conventional machine independently of the main driving means and the special purpose cam means, so that the turret and the cross slides are driven by said electrically controlled driving means, rather than said main driving means and said special purpose cam means, thereby eliminating the plurality of special purpose cam means otherwise necessary for the operation of the conventional machine.

9. An apparatus of claim 8, wherein said actuating means operates pneumatically on said engaging means.

10. An apparatus of claim 9, wherein said pneumatic means includes an air solenoid and an air cylinder, wherein the air cylinder means includes piston means, one end of which is connected to the engaging means.

11. An apparatus of claim 8, wherein the screw machine includes a deep hole drilling mechanism and wherein the improvement further includes a double air solenoid and a double air cylinder for separately controlling the engagement and disengagement of a deep hole drilling mechanism.

12. The apparatus of claim 8, wherein said electrically actuatable driving means for the turret and the cross slides includes ball screw means interfacing with the turret and the cross slides and motor means for driving said ball screw means.

13. The apparatus of claim 12, wherein said motor means is selected from the group comprising: A DC servo motor and an AC stepping motor.

* * * * *